United States Patent
Romca et al.

(10) Patent No.: US 6,601,913 B2
(45) Date of Patent: Aug. 5, 2003

(54) PASSENGER CHAIR WITH A CONVENIENCE DEVICE

(75) Inventors: Jens Romca, Kiel (DE); Jochen Mueller, Kiel (DE); Markus Schumacher, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/804,536

(22) Filed: Mar. 9, 2001

(65) Prior Publication Data

US 2001/0024056 A1 Sep. 27, 2001

(30) Foreign Application Priority Data

| Mar. 9, 2000 | (DE) | 100 11 423 |
| Oct. 24, 2000 | (DE) | 100 52 593 |

(51) Int. Cl.[7] ............................. A47C 7/62; A47C 31/00
(52) U.S. Cl. ........................ 297/188.04; 297/188.06; 297/463.1; 224/275; 40/320; 40/727
(58) Field of Search ...................... 297/188.04, 182, 297/188.14, 188.15, 188.16, 188.18, 188.2, 463.1; 224/275; 40/658, 647, 320, 727

(56) References Cited

U.S. PATENT DOCUMENTS

| 2,767,895 | A | * | 10/1956 | Smith .......................... 224/275 |
| 3,333,890 | A | * | 8/1967 | Whitwam ............... 297/188.04 |
| 3,547,326 | A | * | 12/1970 | Trammell .................... 224/275 |
| 4,726,621 | A | * | 2/1988 | Muller ........................ 297/146 |
| 5,356,061 | A | * | 10/1994 | Yu ........................... 224/275 X |
| 6,131,993 | A | * | 10/2000 | Pesta et al. ......... 297/188.04 X |
| 6,149,229 | A | * | 11/2000 | Dillon et al. ............ 297/188.2 |

FOREIGN PATENT DOCUMENTS

| DE | 3447179 | 7/1986 |
| DE | 4319214 | 8/1994 |

* cited by examiner

Primary Examiner—Anthony D. Barfield
(74) Attorney, Agent, or Firm—W. F. Fasse; W. G. Fasse

(57) ABSTRACT

A passenger chair or a group of passenger chairs, particularly in an aircraft cabin, is equipped with a convenience device that includes an open storage bail which can hold only flat articles but not waste material, and a waste container for holding waste material but not flat articles. The storage bail and waste container form either a mounting unit or retrofit kit or are separate components. In both instances the mounting unit and the separate components are secured to a back facing area of a chair or group of chairs. The separate components are preferably so constructed that individual retrofit kits are provided.

13 Claims, 4 Drawing Sheets

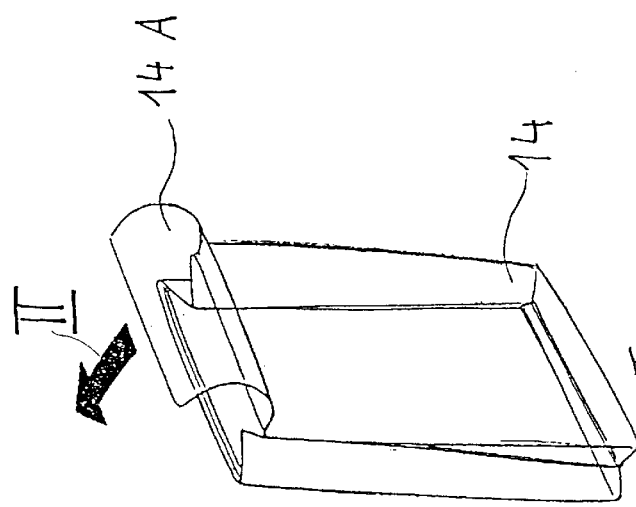
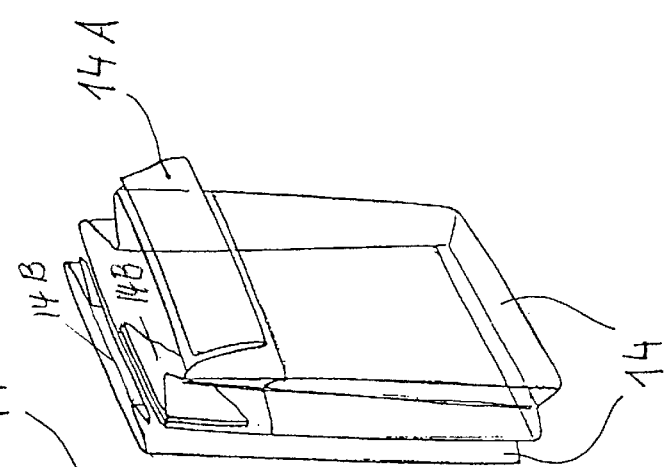
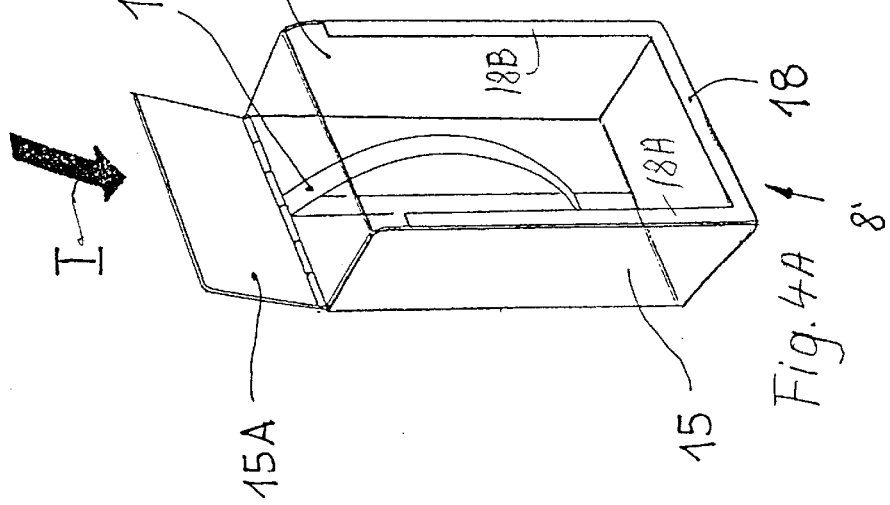

PASSENGER CHAIR WITH A CONVENIENCE DEVICE

PRIORITY CLAIM

This application is based on and claims the priority under 35 U.S.C. §119 of German Patent Applications 100 11 423.7, filed on Mar. 9, 2000 and 100 52 593.8, filed on Oct. 24, 2000, the entire disclosures of which are incorporated herein by reference.

FIELD OF THE INVENTION

The invention relates to a passenger chair or a group of passenger chairs equipped with a convenience device particularly for use in a passenger compartment or passenger cabin in a passenger aircraft.

BACKGROUND INFORMATION

It is well known to equip passenger seats, particularly aircraft passenger seats, with a convenience device for storing articles and for collecting waste. A pouch for holding printed safety instructions, onboard information, newspapers, magazines and the like is normally secured to the backrest of a passenger seat. German Patent Publication DE 34 47 179 discloses such a pouch in the form of a storage net equipped with elastic strings. Such pouches, even if they are made of netting, are not convenient for holding waste that is produced by passengers. The waste includes drinking cups, bottles, wrapping material, paper waste including used napkins, tissues and empty beverage cans. Passengers nevertheless store this refuse in the pouch where it is hard to retrieve. If the refuse is not stored in these pouches, it is simply dropped to the floor. In both instances the work of the clean-up crew is made more difficult because it is time consuming to retrieve the refuse from the pouches or collect it from the floor. Additionally, these methods of storing refuse are inconvenient for the passengers as well, because a passenger must hold the pouch open with one hand and stuff the refuse into the pouch with the other hand. Even "storing" the refuse on the cabin floor becomes a nuisance particularly on long flights.

Further, cleaning crews must either remove outdated material from these pouches and replace, for example magazines with new magazines. This work also requires the use of both hands. If waste and useful articles are mixed in the pouch, the cleaning crew is required to separate the useful articles from the refuse which also requires the use of both hands in most instances because the material that must remain in the pouch needs to be orderly arranged and, if necessary, cleaned or replaced. The time needed for these operations increases the total time for the cleaning and preparation of the cabin for the next flight which has a negative influence on the so-called turn-around time. The shorter the turn-around time, the better is the profitability of the aircraft operation.

German Patent Publication DE 43 19 214 discloses a waste bag secured to the backrest of a passenger seat. Such waste bags are to be held in place in the area of the folding table that is secured to the back of the backrest, whereby the waste bag is held in place by a mounting strip. The mounting strip is secured either to the backrest in the area of the upwardly folded table or it is secured directly to the backrest below the table or even directly to the table. The known solution of the problem makes it possible to collect the waste separate from any storage of useful flat articles, such as magazines and so forth. However, the conventional solution still leaves it to the passenger whether to stuff the waste into the waste bag or into the pouch. This happens particularly when the access to the waste bag is inconvenient, for example when the folding table is still in its up-position. In that case experience shows that passengers tend to stuff the waste into the storage pouch, whereby the efforts and expenses for the cabin cleaning are hardly reduced because the cleaning crew must still check the storage pouches in order to remove waste in case waste is contained in the storage pouches. The above described prior art leaves room for improvement particularly with regard to avoiding stuffing waste into storage pouches.

OBJECTS OF THE INVENTION

In view of the foregoing it is the aim of the invention to achieve the foregoing objects singly or in combination:

to avoid the above problems by preventing passengers from mixing useful articles such as newspapers, magazines and the like with waste materials in the same pouch;

to construct the storage facility and the waste collecting facility in such a way that waste cannot be placed in the storage facility and useful articles cannot be conveniently stored in the waste collecting facility; and to substantially reduce the time required for cleaning and preparing a cabin for the next flight.

SUMMARY OF THE INVENTION

The above objects have been achieved according to the invention by constructing a passenger convenience device comprising a storage bail for flat articles and a separate waste container to be secured in the back facing area of a backrest or armrest of a passenger chair or a group of passenger chairs. The storage bail functions as a clamping or holding bail for storing magazines, flight and aircraft information and the like. The bail is essentially open on four sides and particularly the bail is open backward and thus capable of holding only flat articles while causing trash to fall out through the backward facing opening. The separate waste container is so constructed that it will accept waste, but not flat articles without an extra effort, for example folding the flat articles or rolling-up the flat articles.

At least one waste container is provided for a group of passenger seats, whereby the waste container is preferably secured to the backward facing end of an armrest.

It is an advantage of the invention that the profitability of an aircraft is increased because cleaning crews no longer have to manually separate waste from useful articles. Thus, the turn-around time is reduced and the aircraft can be used more efficiently. Another advantage is seen in that the useful flat articles, such as magazines are more visible to the passenger than heretofore, since only a narrow clamping bail holds the flat articles in place so that inspection is possible without removing the articles from the bail. Furthermore, the nuisance of a cluttered cabin floor is avoided, at least for those passengers that use the present convenience device.

BRIEF DESCRIPTION OF THE DRAWINGS

In order that the invention may be clearly understood, it will now be described in connection with an example embodiment, with reference to the accompanying drawings, wherein:

FIG. 4A shows a waste container constructed as a dispenser for storing waste bags as used in the present device;

FIG. 4B shows two waste bags for use in the dispenser of FIG. 4A; and

FIG. 4C illustrates a waste bag of FIG. 4B with its closure flap unfolded ready for closing the bag.

DETAILED DESCRIPTION OF PREFERRED EXAMPLE EMBODIMENTS AND OF THE BEST MODE OF THE INVENTION

Figure 1:
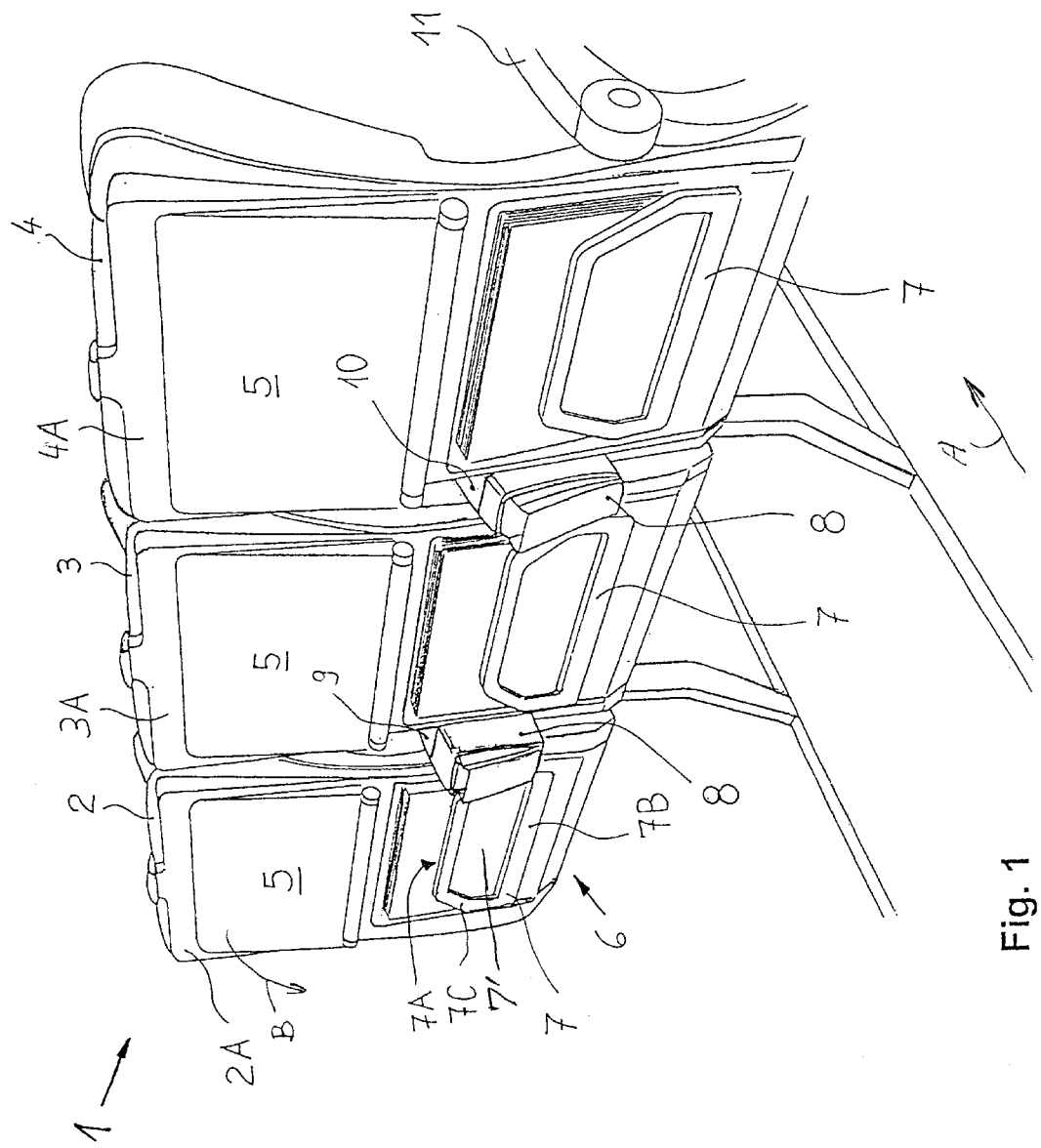
FIG. 1 shows a perspective view onto the backside of a group of three passenger chairs equipped with a convenience devices according to the invention.

FIG. 1 shows a passenger chair group 1 as seen from behind at an angle relative to the longitudinal aircraft axis indicated by an arrow A. The group 1 comprises, for example three chairs 2, 3 and 4. Each chair has a backrest 2A, 3A and 4A respectively. A folding table 5 is conventionally secured to the upper part of each backrest 2A, 3A, 4A. These tables 5 can be folded down as indicated by the arrow B. According to the invention the conventional pouches for storing articles such as magazines have been replaced by a passenger convenience device 6 mounted to the lower end of the backrests and/or partly to back facing portions of armrests 9, 10 and/or 11. Each passenger convenience device 6 comprises at least one storage bail 7 for each chair while two waste containers 8 may be shared by passengers sitting in three chairs.

By replacing conventional pouches and netting with the present storage bails 7 according to the invention, passengers can no longer put waste, including used tissues and emergency bags, into these clamping bails 7, because the clamping bails are open as will be described in more detail below with reference to FIG. 2. Each bail 7 provides a relatively narrow storage space 7A between the back of the backrest and the bail frame 7C held in place by a bail mounting 7B in which the lower frame section of the bail 7 is held, preferably removably inserted. Only flat articles can be stored in the space 7A because other articles such as small bottles, glasses, used tissues, and emergency bags, yogurt containers and the like fall out through the large opening 7' surrounded by the bail frame 7C. The storage bail has a certain biasing tendency toward the backrest 2A, 3A, 4A to leave the space 7A accessible without the need for using both hands, unless flat articles such as books are to be inserted into the space 7A, which are thicker than the width between the bail 7 and the backrest.

If the space 7A is filled with flat articles the bail performs a clamping action to hold the flat articles in place. For this purpose the bail 7 is preferably made of a sufficiently elastic material such as synthetic materials, fiber composite materials or metal. The bail mounting 7B is either part of the bail frame, in which case the bail is permanently secured to the back wall of the backrest or 7B could be a sectional rail into which a lower frame edge of the bail can be inserted and removed if desired. Each backrest 2A, 3A and 4A is preferably provided with such a storage or clamping bail. If there is no flat material stored in the space 7A, the bail 7 is preferably slightly spaced from the wall of the respective backrest but provides a certain biasing force toward the backrest when flat material is inserted into the space 7A. This arrangement makes it possible to insert the flat material and withdraw it again with but one hand, which is very convenient for a passenger.

It is also possible to construct the frame 7C of the clamping bail 7 of a relatively stiff material and insert a respective spring in the mounting sectional rail 7B to provide the required biasing force that will hold the flat material in the space 7A. However, it is preferred to provide the bail with an inherent elasticity to avoid a separate spring.

The frame 7C of the bail is relatively narrow so that the open area 7' permits a quick visual inspection of the storage space 7A. Many different configurations may be used for the shape of the bail and instead of synthetic material other materials, such as light metal or wire or sheet metal may be used to form the bail.

In addition to the bail 7 the convenience device 6 preferably comprises a waste container 8 constructed so as not to be suitable for the storage of flat materials. The waste container 8 makes it possible for the passenger to collect waste material directly at his seat and store it in the waste container 8 without depending on the help of a flight attendant. Since the bail 7 will not hold waste material of the kind accumulating in the area of an aircraft passenger seat, the passenger is obliged to collect the waste in the container 8 because the waste material will fall out through the opening 7' of the clamping or storage bail 7.

The waste container 8 is preferably secured to a back facing portion of each of the armrests such as the intermediate armrests 10 and preferably also to the armrest 11. This arrangement of the waste containers 8 is a compromise that gives the passenger a relatively easy access to the waste container while simultaneously permitting a quick grasping of the waste container by the cleaning crew for either emptying the waste container or for removing a waste bag from the waste containers as will be described in more detail below. However, it is not necessary to provide each seat with a waste container 8. Two or even one waste container per row of seats may be sufficient. If only one container is used it should be secured to the back of the armrest 11 adjacent to the aisle in order to facilitate the waste removal by the cleaning crew. Positioning the waste container 8 at the rear end of the armrest 11 is an optimal position for the cleaning crew. Either the waste container or an insert in the waste container is removable for cleaning.

Figure 2:
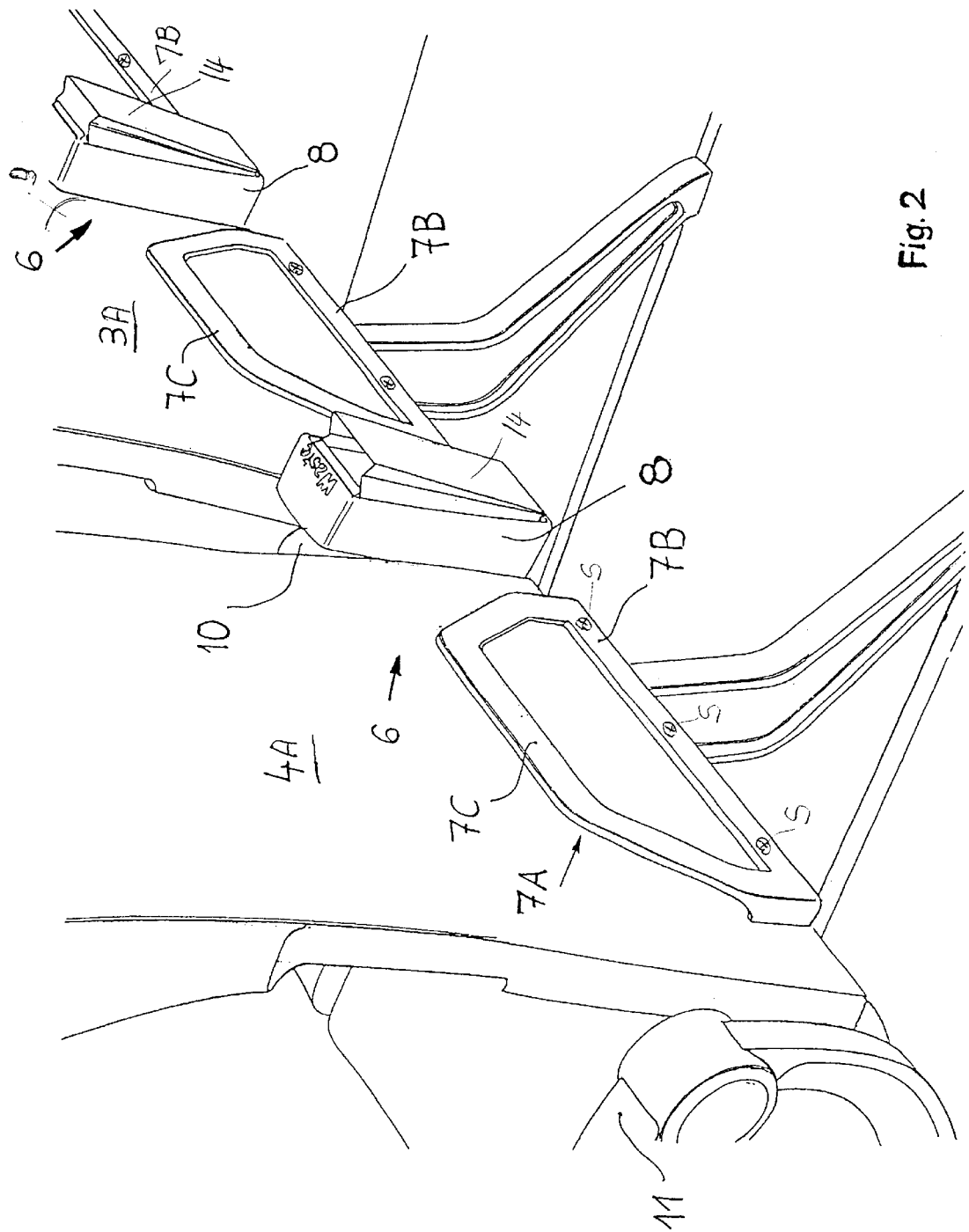
FIG. 2 is a view similar to that of FIG. 1, however shown on a somewhat enlarged scale and from a different viewing direction.

FIG. 2 shows the attachment of the bail frames 7C to the back of the respective backrest by screws S. The waste containers 8 are constructed as dispensers for removable waste bags 14. Here again it is preferred to mount the containers 8 to the backs of the respective armrests 9, 10 and/or 11. FIGS. 1 and 2 also show that each storage bail 7 is laterally open so that small articles fall out of the storage bail. As shown in FIG. 1 the term "laterally" refers to the backside and a backward direction opposite to the arrow A.

Figure 3:
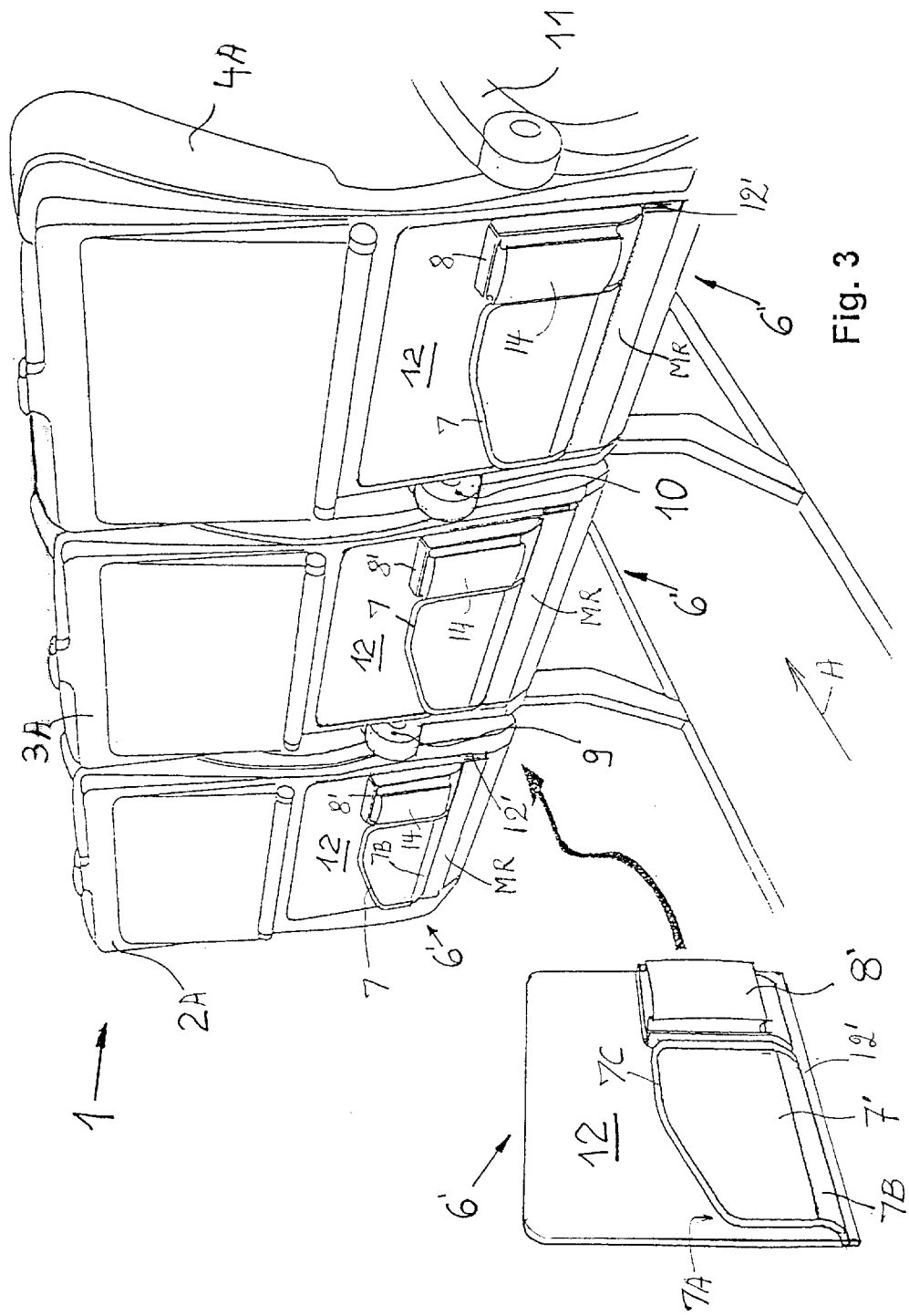
FIG. 3 is a view similar to that of FIG. 1, however illustrating a modified embodiment of the present convenience device constructed as a retrofit kit.

The attachment is preferably such, that the bails 7 as well as the waste obtainers 8 form a retrofit kit for attachment to passenger chairs that are currently equipped with pouches. As shown in FIGS. 1, 2 and 3 the backwardly open bails 7 are positioned either vertically or substantially vertically depending on the position of the respective backrest to which the bail is mounted.

FIG. 3 shows a second embodiment of a convenience device 6' according to the invention connected to the lower backside of the respective backrests 2A, 3A, 4A. Each convenient device 6' is constructed as a retrofit kit comprising a mounting 12 such as a plate or frame having a lower edge 12' fitting into a sectional mounting rail MR secured to the respective backrest. Rather than securing the waste container constructed as a dispenser 8' to the rear ends of the armrests 9 and 10, the dispenser 8' and the bail 7 for holding flat articles are secured to the mounting 12 and the lower edge 12' of the mounting is inserted into the mounting rail MR. For facilitating the cleaning operation each waste bag dispenser 8' is positioned to the right of the respective bail 7 as viewed in the direction A. Each dispenser 8 dispenses waste bags 14 as will be described in more detail below with reference to FIGS. 4A, 4B, 4C. The use of a separate mounting 12 for the bail 7 and the dispenser 8' facilitates the retrofitting of conventional seats by removing the pouches and securing the mounting 12. However, it is also possible to attach the bail 7 and the dispenser 8' individually to the respective backrest 2A, 3A, 4A, preferably in a removable manner.

The waste container 8 is preferably constructed as a waste bag dispenser 8' as illustrated in FIG. 4A. The dispenser 8' holds at least one, preferably a plurality, of disposable waste bags 14A shown in FIGS. 4B and 4C. The dispenser 8' is so constructed that the withdrawal of a waste bag 14 results in the pushing of the next waste bag into the withdrawal position.

FIG. 4A shows a waste bag dispenser 8' having a housing 15 with an open front 13 surrounded by U-frame 18 that keeps a bag or bags 14 in the housing 15 against the pressure of a spring bail 16 that pushes the bags 14 toward the open front 13. The U-frame 18 has lateral sections 18A and 18B that are shorter than the housing 15 to provide a dispensing gap 17 that can even be enlarged by lifting the hinged cover 15A of the housing 15.

As shown in FIG. 4B a plurality of waste bags 14 are constructed with foldable gussets or side walls to facilitate the insertion of a plurality of such bags into the housing 15 as indicated by the arrow I in FIG. 4A. Preferably, each bag is provided with a folding closure flap 14A and with a reinforcement at 14B at least along the upper edge of the bag opening. Thus, the bag can be slightly lifted by the flap 14A which projects out of the opening 17 of the dispenser 15 and the flap 14A can then be immediately folded over as shown by the arrow II in FIG. 4C to close the bag so that contact with the waste in the bag is prevented.

Other types of dispensers may be employed in combination with the present bail for holding flat articles.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A passenger chair comprising a support, a seat and a backrest mounted on said support, a convenience device secured to said passenger chair on a backwardly facing chair area, said convenience device comprising a storage bail (7) secured to said backrest for holding a flat article, said convenience device further comprising a separate waste container secured to said chair next to said storage bail, for holding waste material, and wherein said storage bail comprises a bail frame (7C) surrounding an opening (7') facing backward away from said backrest, said bail frame including an upper frame member above said backward facing opening (7'), said upper frame member forming a crosspiece for holding said flat article in place, said backward facing opening (7') letting said waste material fall out of said bail frame through said backward facing opening.

2. The passenger chair of claim 1, further comprising a bail mounting (7B) securing said storage bail to said backrest, and wherein said bail frame (7C) comprises an elastical biasin force directed toward said backrest and forming a flat space (7A) for the insertion of said flat article.

3. The passenger chair of claim 1, wherein said separate waste container comprises a waste bag dispenser (8') for holding at least one removable waste bag (14).

4. The passenger chair of claim 1, further comprising at least one armrest having a backwardly facing armrest portion, wherein said waste container is connected to said backwardly facing armrest portion.

5. The passenger chair of claim 1, wherein said passenger chair is arranged next to an aisle in a passenger cabin, wherein said passenger chair comprises at least one armrest next to said aisle, and wherein said waste container is secured to said at least one armrest next to said aisle on a backwardly facing portion of said armrest.

6. The passenger chair of claim 1, wherein said waste container is arranged next to said storage bail and secured to said backrest of said passenger chair.

7. The passenger chair of claim 1, further comprising a mounting (12), means for attaching said mounting to said backrest, and wherein said storage bail (7) and said waste container are secured to said mounting.

8. The passenger seat of claim 7, wherein said mounting, said storage bail, and said separate waste container form a preassembled retrofit kit for attachment to said backrest.

9. The passenger chair of claim 7, wherein said means for attaching said mounting comprise an upwardly open sectional rail (MR) secured to said backrest, and wherein said mounting comprises a mounting plate carrying said storage bail and said waste container, and wherein said mounting plate comprises an edge fitting into said upwardly open section.

10. An aircraft passenger cabin, comprising at least one group of passenger chairs including at least one passenger chair comprising a support, a seat and a backrest mounted on said support, and at least one convenience device (6, 6') secured to a backwardly facing area of said at least one passenger chair, said convenience device comprising an open storage bail for holding a flat article and a separate waste container for holding waste articles, and wherein said open storage bail comprises a bail frame (7C) surrounding an opening (7') facing backward away from said backrest, said bail frame (7C) including an upper frame member above said backward facing opening (7'), said upper frame member forming a crosspiece for holding said flat article in place, said backward facing opening (7') letting said waste material fall out of said bail frame through said backward facing opening (7').

11. The aircraft passenger cabin of claim 10, wherein said open storage bail and said separate waste container are constructed as a retrofit kit.

12. A passenger chair comprising a support, a seat and a backrest mounted on said support, a convenience device secured to said passenger chair on a backwardly facing chair area, said convenience device comprising a storage bail (7) secured to said backrest for holding a flat article, said convenience device further comprising a separate waste container secured to said chair next to said storage bail for holding waste material, and wherein said separate waste container comprises a waste bag dispenser (8') for holding at least one removable waste bag (14).

13. A passenger chair comprising a support, a seat and a backrest mounted on said support, a convenience device secured to said passenger chair on a backwardly facing chair area, said convenience device comprising a storage bail (7) secured to said backrest for holding a flat article, said convenience device further comprising a separate waste container secured to said chair next to said storage bail for holding waste material, said passenger chair further comprising at least one armrest having a backwardly facing armrest portion, wherein said waste container is connected to said backwardly facing armrest portion.

* * * * *

UNITED STATES PATENT AND TRADEMARK OFFICE
CERTIFICATE OF CORRECTION

PATENT NO.    : 6,601,913 B2  Page 1 of 1
DATED         : August 5, 2003
INVENTOR(S)   : Romca et al.

It is certified that error appears in the above-identified patent and that said Letters Patent is hereby corrected as shown below:

<u>Title page,</u>
Item [56], References Cited, U.S. PATENT DOCUMENTS, replace "Muller" by -- Müller --.

<u>Column 6,</u>
Line 33, replace "section." by -- sectional rail. --.

Signed and Sealed this

Seventh Day of October, 2003

JAMES E. ROGAN
*Director of the United States Patent and Trademark Office*